(12) United States Patent
Yang et al.

(10) Patent No.: US 12,502,141 B2
(45) Date of Patent: Dec. 23, 2025

(54) NEURAL NETWORK PROCESSING OF OCT DATA TO GENERATE PREDICTIONS OF GEOGRAPHIC-ATROPHY GROWTH RATES

(71) Applicant: Genentech, Inc., South San Francisco, CA (US)

(72) Inventors: Qi Yang, Foster City, CA (US); Simon S. Gao, San Francisco, CA (US)

(73) Assignee: GENENTECH, INC., South San Francisco, CA (US)

( * ) Notice: Subject to any disclaimer, the term of this patent is extended or adjusted under 35 U.S.C. 154(b) by 813 days.

(21) Appl. No.: 17/782,476

(22) PCT Filed: Dec. 4, 2020

(86) PCT No.: PCT/US2020/063362
§ 371 (c)(1),
(2) Date: Jun. 3, 2022

(87) PCT Pub. No.: WO2021/113672
PCT Pub. Date: Jun. 10, 2021

(65) Prior Publication Data
US 2023/0036463 A1 Feb. 2, 2023

Related U.S. Application Data

(60) Provisional application No. 62/988,797, filed on Mar. 12, 2020, provisional application No. 62/944,201, filed on Dec. 5, 2019.

(51) Int. Cl.
*A61B 5/00* (2006.01)
*A61B 3/00* (2006.01)
(Continued)

(52) U.S. Cl.
CPC .......... *A61B 5/7275* (2013.01); *A61B 3/0025* (2013.01); *A61B 3/102* (2013.01);
(Continued)

(58) Field of Classification Search
CPC ..... A61B 5/7275; A61B 3/0025; A61B 3/102; A61B 5/7267; A61B 3/1233;
(Continued)

(56) References Cited

U.S. PATENT DOCUMENTS

| 10,360,673 B2 * | 7/2019 | Huang ................. G06T 7/30 |
| 2018/0235467 A1 | 8/2018 | Celenk |

(Continued)

FOREIGN PATENT DOCUMENTS

| CN | 108830856 A | 11/2018 |
| CN | 110363226 A | 10/2019 |

(Continued)

OTHER PUBLICATIONS

Zhang et al., "A Multi-Scale Deep Convolutional Neural Network for Joint Segmentation and Prediction of Geographic Atrophy In SD-OCT Images," 2019 IEEE 16th International Symposium on Biomedical Imaging (ISBI 2019), Venice, Italy, 2019, pp. 565-568. (Year: 2019).*

(Continued)

*Primary Examiner* — Neil R Mclean
(74) *Attorney, Agent, or Firm* — MORRISON & FOERSTER LLP

(57) ABSTRACT

Embodiments disclosed herein generally relate to predicting geographic-atrophy lesion growth and/or geographic atrophy lesion size in an eye. The predictions can be generated by processing a data object using a neural network. The data object may include a three-dimensional data object representing a depiction of at least part of the eye or a multi-channel data object representing one or more decorresponding pictions of at least part of the eye. The neural network can include a convolutional multi-task neural network that is trained to learn features that are predictive of both lesion-growth and lesion-size outputs.

23 Claims, 8 Drawing Sheets

(51) Int. Cl.
  *A61B 3/10* (2006.01)
  *G06T 7/00* (2017.01)
  *G06T 7/12* (2017.01)
  *G06T 7/60* (2017.01)

(52) U.S. Cl.
  CPC .......... *A61B 5/7267* (2013.01); *G06T 7/0014* (2013.01); *G06T 7/12* (2017.01); *G06T 7/60* (2013.01); *G06T 2200/08* (2013.01); *G06T 2207/10101* (2013.01); *G06T 2207/20081* (2013.01); *G06T 2207/20084* (2013.01); *G06T 2207/30041* (2013.01); *G06T 2207/30096* (2013.01)

(58) Field of Classification Search
  CPC ....... A61B 3/1241; G06T 7/0014; G06T 7/12; G06T 7/60; G06T 2200/08; G06T 2207/10101; G06T 2207/20081; G06T 2207/20084; G06T 2207/30041; G06T 2207/30096; G06T 2200/04; G06T 7/0012; G06N 3/048; G06N 3/045; G06N 3/08; G06N 3/0464; G16H 10/20; G16H 30/40; G16H 50/50
  USPC .......................................................... 382/128
  See application file for complete search history.

(56) References Cited

U.S. PATENT DOCUMENTS

| | | | |
|---|---|---|---|
| 2018/0315193 A1 | 11/2018 | Paschalakis | |
| 2019/0005684 A1* | 1/2019 | De Fauw | G06V 10/82 |
| 2020/0275834 A1 | 9/2020 | Tokuda et al. | |
| 2021/0369195 A1* | 12/2021 | Russakoff | G16H 30/40 |

FOREIGN PATENT DOCUMENTS

| | | |
|---|---|---|
| WO | 2017070109 A1 | 4/2017 |
| WO | 2018055545 A1 | 3/2018 |
| WO | 2018069768 A2 | 4/2018 |

OTHER PUBLICATIONS

Chen, Q. et al. (Sep. 1, 2015). "Restricted Summed-Area Projection for Geographic Atrophy Visualization in SD-OCT Images," Translational Vision Science & Technology 4(5):1-13.

clinicaltrails.gov (Sep. 25, 2014). "NCT02247531—A Study Investigating the Safety and Efficacy of Lampalizumab Intravitreal Injections in Participants With Geographic Atrophy Secondary to Age-Related Macular Degeneration (SPECTRI)," 10 pages.

De Moura, J. et al. (Jul. 14, 2019). "Deep Feature Analysis in a Transfer Learning-Based Approach for The Automatic Identification of Diabetic Macular Edema," 2019 International Joint Conference on Neural Networks, pp. 1-8.

International Preliminary Report on Patentability, issued May 17, 2022, for PCT Application No. PCT/US2020/063362, filed Dec. 4, 2020, 11 pages.

International Search Report and Written Opinion, mailed Feb. 25, 2021, for PCT Application No. PCT/US2020/063362, filed Dec. 4, 2020, 14 pages.

Li, Y. et al. (Nov. 2, 2018). "Automated and Robust Geographic Atrophy Segmentation for Time Series SD-OCT Images," Advances in Databases and Information Systems, pp. 249-261.

Normand, G. et al. (Jul. 2019). "Prediction of Geographic Atrophy Progression by Deep Learning Applied to Retinal Imaging," ARVO Annual Meeting Abstract 60:1452, Abstract, 2 pages.

Xu, R. et al. (Jul. 6, 2018). "Multi-path 3D Convolution Neural Network for Automated Geographic Atrophy Segmentation in SD-OCT Images," Nature, pp. 493-503.

Zhang, Y. et al. (Apr. 8, 2019). "A Multi-Scale Deep Convolutional Neural Network for Joint Segmentation and Prediction of Geographic Atrophy In SD-OCT Images," 2019 IEEE 16th International Symposium on Biomedical Imaging, 4 pages.

* cited by examiner

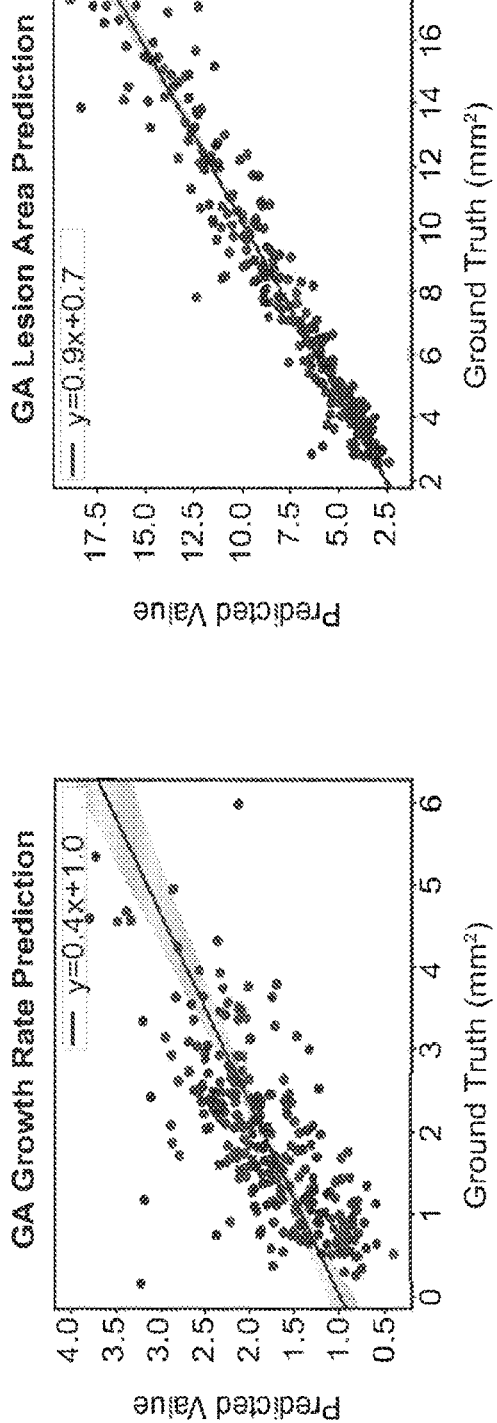
FIG. 8B
FIG. 8A
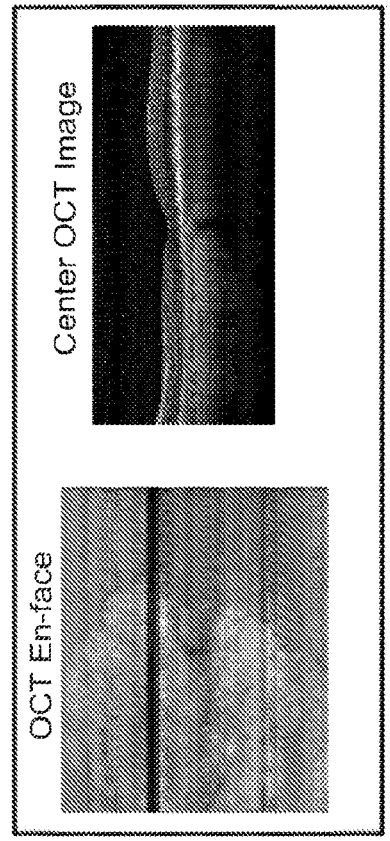
FIG. 8D
FIG. 8C

NEURAL NETWORK PROCESSING OF OCT DATA TO GENERATE PREDICTIONS OF GEOGRAPHIC-ATROPHY GROWTH RATES

CROSS-REFERENCE TO RELATED APPLICATIONS

This is a U.S. national phase application under 35 U.S.C. § 371 of International Application No. PCT/US2020/063362, filed on Dec. 4, 2020, which application claims the benefit of and priority to U.S. Provisional Patent Application Numbers: 62/944,201 (filed on Dec. 5, 2019) and 62/988,797 (filed on Mar. 12, 2020). Each of these applications is hereby incorporated by reference in its entirety for all purposes.

BACKGROUND

Geographic atrophy (GA) is one type of the advanced age-related macular degeneration (AMD) and results in photoreceptor and supporting cell degeneration and progressive vision loss. The condition affects millions of people worldwide. In developed nations, approximately 1 in 29 people over age 75 have geographic atrophy. Geographic atrophy is characterized by the progressive structural loss of retinal pigment epithelium (RPE), adjacent photoreceptors and choriocapillaris. Geographic-atrophy progression demonstrates large interpatient variability. Currently there is no approved treatment to prevent or slow the progression of geographic atrophy.

A geographic-atrophy lesion can be imaged by various imaging modalities. Traditionally, two-dimensional Fundus Auto-Fluorescent (FAF) images were used to quantify the geographic-atrophy lesion area. The change in FAF derived lesion area over some time period (geographic atrophy growth rate) is accepted as an anatomic outcome parameter that indicates whether and/or an extent to which a subject's geographic atrophy is progressing. Still, the two-dimensional nature of FAF images may limit their ability to provide refined structural information about lesion area. Accordingly, there is a need for improved assessments of lesion area that may enhance an understanding of GA onset and progression, in addition to the quantification of GA lesion area produced by FAF images.

SUMMARY

In some embodiments, a method is provided. A three-dimensional data object that corresponds to at least a partial depiction of an eye of a subject is accessed. The three-dimensional data object can include a three-dimensional depiction of a volume of the eye of the subject. The three-dimensional data object is processed using a convolutional neural network (e.g., Inception neural network) to generate a prediction of a subsequent growth of a geographic-atrophy lesion in the eye or a subsequent size of a geographic-atrophy lesion in the eye. The subsequent growth of the geographic-atrophy lesion can include a growth of one or more geographic-atrophy lesions in the eye, and/or the subsequent size of the geographic-atrophy lesion can include a subsequent size of one or more geographic-atrophy lesions in the eye. The convolution neural network can include one or more three-dimensional convolution modules, a pooling layer, and/or one or more optional units (e.g., attention units). The prediction is output.

In some embodiments, the convolutional neural network can be trained to simultaneously predict a current geographic-atrophy lesion size and a subsequent geographic-atrophy state. The subsequent geographic-atrophy state can include a subsequent geographic-atrophy lesion growth or a subsequent geographic-atrophy lesion size.

In some embodiments, the processing of the three-dimensional data object using the convolutional neural network can further result in another prediction of a current size of a geographic-atrophy lesion in the eye.

In some embodiments, the method can include generating the three-dimensional data object. For example, each image of a set of two-dimensional images can be segmented to identify a segment bounded by a predicted location of a Bruch's membrane and/or an inner limiting membrane. Generating the three-dimensional data object can also include accessing a set of two-dimensional B-scan OCT images of the eye of the subject. A set of feature maps can be generated from the set of two-dimensional B-scan OCT images. The three-dimensional data object can be generated so as to include the set of feature maps.

In some embodiments, generating the three-dimensional data object includes accessing a set of two-dimensional B-scan OCT images of the eye of the subject. For each of the set of two-dimensional B-scan OCT images, a set of pixels depicting a particular structure (e.g., Bruch's membrane or inner limiting membrane) of the eye can be identified. Each of the set of B-scan OCT images can be flattened based on the set of pixels. The three-dimensional data object can be generated so as to include at least part of each flattened B-scan OCT image.

In some embodiments, the method can include training another convolutional neural network using a training data set to produce a first set of learned parameter values. Transfer learning can be used to train the convolutional neural network by setting a set of parameter values for the convolutional neural network to the first set of learned parameter values and using another training data set to further train the convolutional neural network to produce a second set of learned parameter values. The convolutional neural network can be configured with the second set of learned parameter values when processing the three-dimensional data object.

In some embodiments, the method can further include determining aspects of a clinical study based on the prediction. For example, input data can be input by a user that includes or identifies the three-dimensional data object. The prediction can be received and, based on the prediction, it can be determined that the subject is eligible to participate in a particular clinical study. As another example, after receiving the prediction, a stratification can be determined for a particular clinical study in which the subject is or will be involved. For example, the stratification can be to assign individual subjects to various treatment and/or control groups in a manner such that the groups have similar default predicted geographic-atrophy assessments if no treatment was administered and/or to parse or normalize results before making comparisons between various groups. A clinical study can be generated based on the stratification. The clinical-study result can be output. In another instance, after receiving the prediction, an adjustment can be determined for a particular clinical study in which the subject is or will be involved. The adjustment can include a change to a treatment, such as a change to a medicine, a change to a dosage, and/or a change to an interval of time between treatments. An implementation of the adjusted clinical study can be facilitated.

In some embodiments, a method is provided. The method includes detecting, at a user device, input data that includes or identifies three-dimensional data object that corresponds to at least a partial depiction of an eye of a subject. A request communication that corresponds to a request to generate a predicted subsequent geographic-atrophy characteristic of the eye of the subject is transmitted to a remote computing system. The request communication includes the input data. In response to receiving the request communication, the remote computing system processes the three-dimensional data object using a convolutional neural network to generate a prediction of a subsequent growth of a geographic-atrophy lesion in the eye or a subsequent size of a geographic-atrophy lesion in the eye. The prediction is transmitted to the user device, which receives the prediction from the remote computing system.

In some embodiments, the method can further include collecting a set of images of the eye of the subject. The three-dimensional data object can be generated using the set of images.

Some embodiments of the present disclosure include use of a geographic-atrophy prediction in a treatment of a subject. The geographic-atrophy prediction is provided by a computing device implementing a computational model based on subject data to provide the geographic-atrophy prediction. The computational model includes a convolutional neural network configured to process a three-dimensional data object corresponding to at least a partial depiction of an eye of the subject.

In some embodiments, a method is provided. The method includes accessing a data object that includes at least three data channels. Each of the at least three data channels includes a two-dimensional image corresponding to at least a partial depiction of an eye of a subject. The method further includes processing the data object using a convolutional neural network to generate a prediction of a subsequent growth of a geographic-atrophy lesion in the eye or a subsequent size of a geographic-atrophy lesion in the eye and outputting the prediction. The convolutional neural network can include one or more two-dimensional convolution modules, a pooling layer, and/or one or more optional units. The subsequent growth of the geographic-atrophy lesion can include a growth of one or more geographic-atrophy lesions in the eye and/or the subsequent size of the geographic-atrophy lesion can include a subsequent size of one or more geographic-atrophy lesions in the eye.

In some embodiments, the data object can include multiple different en-face OCT-based maps of the eye. For example, the data object can include at least two en-face OCT-based scans of the eye and at least one B-scan of the eye. As another example, the data object can include at least one OCT-based en-face scan of the eye and at least one image obtained using a type of imaging modality different than OCT (e.g., FAF).

In some embodiments, the convolutional neural network can be trained to simultaneously predict a current geographic-atrophy lesion size and a subsequent geographic-atrophy state. The subsequent geographic-atrophy state can include a subsequent geographic-atrophy lesion growth or a subsequent geographic-atrophy lesion size.

In some embodiments, the processing of the data object using the convolutional neural network can further generate another prediction of a current size of a geographic-atrophy lesion in the eye.

In some embodiments, the method can further include determining aspects of a clinical study based on the prediction. For example, input data can be input by a user that includes or identifies the three-dimensional data object. The prediction can be received and, based on the prediction, it can be determined that the subject is eligible to participate in a particular clinical study. As another example, after receiving the prediction, a stratification can be determined for a for a particular clinical study in which the subject is or will be involved. For example, the stratification can be to assign individual subjects to various treatment and/or control groups in a manner such that the groups have similar default predicted geographic-atrophy assessments if no treatment was administered and/or to parse or normalize results before making comparisons between various groups. A clinical study can be generated based on the stratification. The clinical-study result can be output.

In some embodiments, a method is provided. The method includes detecting, at a user device, input data that includes or identifies a data object that corresponds to at least a partial depiction of an eye of a subject. A request communication that corresponds to a request to generate a predicted subsequent geographic-atrophy characteristic of the eye of the subject is transmitted to a remote computing system. The request communication includes the input data. In response to receiving the request communication, the remote computing system processes the data object using a convolutional neural network to generate a prediction of a subsequent growth of a geographic-atrophy lesion in the eye or a subsequent size of a geographic-atrophy lesion in the eye. The prediction is transmitted to the user device, which receives the prediction from the remote computing system.

In some embodiments, the method can further include collecting a set of images of the eye of the subject. The data object can be generated using the set of images.

Some embodiments of the present disclosure include use of a geographic-atrophy prediction in a treatment of a subject. The geographic-atrophy prediction is provided by a computing device implementing a computational model based on subject data to provide the geographic-atrophy prediction. The computational model includes a convolutional neural network configured to process a data object corresponding to at least a partial depiction of an eye of the subject.

Some embodiments of the present disclosure include a system including one or more data processors. The system can further include a non-transitory computer readable storage medium containing instructions which, when executed on the one or more data processors, cause the one or more data processors to perform part or all of one or more of the methods disclosed herein.

In some embodiments, a computer-program product is provided that is tangibly embodied in a non-transitory machine-readable storage medium. The computer-program product can include instructions configured to cause one or more data processors to perform part or all of one or more of the methods disclosed herein.

BRIEF DESCRIPTION OF THE DRAWINGS

The present disclosure is described in conjunction with the appended figures:

FIGS. 8A-AD illustrates performance details of all hold-out cases with a multi-task SE model. (A) shows a regression plot of predicted geographic atrophy growth rate against true growth rate; (B) shows a regression plot of predicted geographic atrophy lesion area against true geographic atrophy lesion area; (C) shows an OCT en-face image and center B-scan of an outlier in the geographic atrophy growth-rate prediction; and (D) shows an OCT en-face image and center B-scan of an outlier in geographic atrophy lesion area and geographic atrophy growth-rate predictions.

Figures 1A, 1B, 1C:
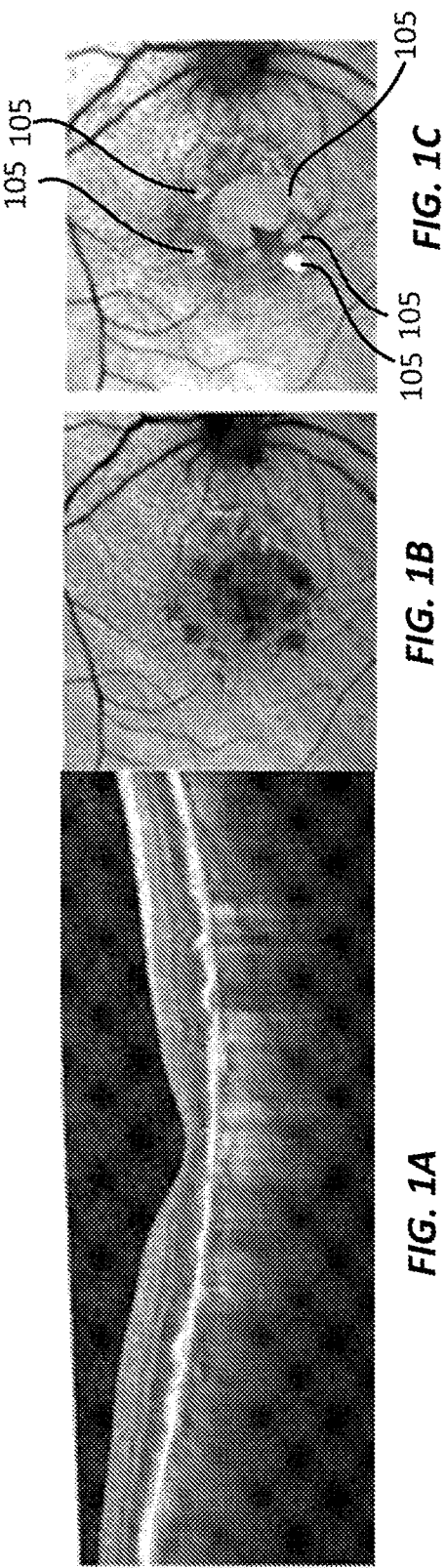
FIG. 1A shows a center B-scan of an OCT volume.
FIG. 1B shows an exemplary FAF image used to quantify lesion area grading.
FIG. 1C shows exemplary identified lesion areas.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Overview

The present disclosure describes a multi-task deep learning architecture that enables (e.g., simultaneous) prediction of a current geographic atrophy (GA) lesion area and geographic atrophy lesion growth rate. GA progression is unique for each individual in terms of lesion area and growth rate. Currently there are no approved treatments to prevent or slow the progression of GA.

Accurate and personalized geographic-atrophy progression prediction may be useful for addressing important research and clinical questions. For example, geographic-atrophy progression predictions may be used to provide subject stratification in clinical studies where slowing geographic-atrophy progression is an endpoint, allowing for targeted enrollment of clinical subjects and improved assessment of treatment effects. Additionally, personalized GA prognosis may be used to more efficiently manage disease and to understand disease pathogenesis by correlating to genotypic or phenotypic signatures.

Traditionally used Fundus Auto-Fluorescent (FAF) images provide two-dimensional structural data on GA lesion area. Optical coherence tomography (OCT) images may provide structural information in addition to lesion area. The additional structural information provided by high resolution three-dimensional (3D) OCT images may provide insights into geographic-atrophy onset and progression that were not possible from FAF images alone. For example, Reticular Pseudo-Drusen, Hyper-reflective foci, multi-layer thickness reduction, photoreceptor atrophy, and wedge-shaped subretinal hyporeflectivity detected on OCT images may be potential precursors or biomarkers associated with geographic-atrophy conversion. However, OCT images are challenging to process due to their 3D nature. Current OCT-derived predictions rely on features extracted from OCT volumes, rather than full OCT images because of the complexity of processing 3D image volumes. In short, current OCT predictions entail additional feature extraction, feature engineering, or image processing steps, or some other abstraction of baseline OCT images.

The present embodiments provide a way to make GA predictions directly from baseline OCT volumes, without additional steps. In particular, the present embodiments include a multi-task 3D neural network for GA lesion size detection and growth rate prediction, directly using baseline, 3D OCT images. In some embodiments, the deep learning architecture of the neural network can include a convolutional neural network (CNN). The deep learning architecture can be configured to receive (as input) three-dimensional OCT image data and/or three-channel image data that represents data captured at a baseline time. In some instances, the deep learning architecture is configured to generate a prediction corresponding to a time subsequent to the baseline time, despite not receiving input collected at the subsequent time. In addition, the networks in the deep learning architecture can be trained end-to-end. This deep learning technique can result in improved accuracy of geographical-atrophy statistics relative to state-of-the-art baseline models.

One or more OCT images collected for a subject can be pre-processed. The pre-processing may be performed to (for example) flatten one or more images to compensate for the curvature of the eye. For example, images may be flattened relative to a structure such as an inner limiting membrane (ILM). The pre-processing may include aligning and/or combining multiple (e.g., flattened) images (e.g., to produce a three-dimensional image). For example, the pre-processing may include converting a set of A-scans (e.g., depicting multiple longitudinal scans) into B-scans (e.g., to flatten the B-scans along a particular biological structure). In some instances, flattened images may then be combined to produce a three-dimensional image (or a flattening may be performed subsequent to combining two-dimensional images to form a three-dimensional image). The pre-processing may further include cropping and/or resizing one or more images to a predefined size and/or by a predefined amount.

The pre-processing may include individually generating each of multiple channels of data. The multiple channels may include two or more channels or three or more channels. At least one, at least two or at least three of the channels may correspond to an OCT channel associated with a particular type of scan (e.g., en-face C-scan or B-scan). In some instances, at least two of the at least three channels may correspond to different types of scans and/or to different imaging modalities. For example, at least one channel may include an image collected using OCT and at least another channel may include an image collected using fundus photography, infra-red imaging or scanning last opthalmoscopy (SLO).

The pre-processed image can be processed by a neural network that includes (for example) a deep neural network, a two-dimensional neural network, a three-dimensional neural network and/or convolutional neural network. The neural network may include one or more convolutional layers (e.g., where each of two or more of the convolutional layers or each of all of the convolutional layers have convolutional filters of a size different than that of another convolutional layer). The neural network may include an activation layer, normalization layer, and/or pooling layer.

The neural network(s) may have been trained and may be configured to predict one or more geographic-atrophy lesion statistics, such as a current volume of a geographic atrophy lesion, a future volume of a geographic atrophy lesion, and/or a future growth rate. The neural network may be a multi-task model trained and configured to simultaneously predict a geographic-atrophy lesion growth rate and a geographic-atrophy lesion size. The multi-task model may have less chance of overfitting on the growth rate prediction task than a model that is not a multi-task model.

FIG. 1A shows an exemplary B-scan OCT image that may be collected and processed in a deep learning workflow. FIG. 1B shows an exemplary fundus auto-fluorescence (FAF) image. FIG. 1C shows lesion grading for the FAF image in FIG. 1B. The FAF image includes geographic-atrophy lesion areas 105.

The predicted growth rate or volume of a geographic-atrophy lesion may be output (e.g., presented or transmitted) along with an identification of a subject and/or eye. The predicted growth rate or volume may inform an automated or human recommendation of treatment and/or of clinical-study enrollment (e.g., subject stratification). For example, the predicted growth rate or predicted volume may be used to determine (e.g., by a human or computing device) whether the subject is eligible for a particular clinical study. The determination may be made by evaluating a rule that indicates that an eligibility requirement is that a predicted growth rate or predicted volume exceeds a predetermined lower threshold and/or is below a predetermined upper threshold. As another example, the predicted growth rate or predicted volume can be used for clinical-study stratification (e.g., to assign individual subjects to various treatment and/or control groups in a manner such that the groups have similar default predicted geographic-atrophy assessments if no treatment was administered and/or to parse or normalize results before making comparisons between various groups).

II. Definitions

As used herein, the term "multi-task model" refers to a model that includes one or more neural networks trained to simultaneously predict multiple statistical variables (e.g., a current geographic-atrophy lesion size and a future geographic-atrophy lesion growth rate). The multi-task model can include one or more neural networks. A multi-task model may avoid overfitting or reduce a likelihood of overfitting due it having been trained to fit two sets of information simultaneously.

As used herein, the term "A-scan" refers to a one-dimensional image of a depth profile along an incident light direction of an eye. Near-infrared light can be guided in a linear direction to generate data at multiple A-scan positions.

As used herein, the term "B-scan" refers to a cross-sectional view of an eye. In some instances, a B-scan is generated in response to a particular type of measurement. For example, near-infrared light can be transmitted into the eye, and the low-coherence interferometry signal can generate a two-dimensional B-scan image. In some instances, a B-scan is a frame composed of an array of A-scans. A B-scan can have a transversal, longitudinal, or axial orientation depending on how the probe is oriented.

As used herein, the term "en-face C-scan" refers to transverse images of layers of an eye at a specified depth. For example, an en-face C-scan can be a transverse image of a retinal or choroidal layer of the eye. A C-scan can be obtained by scanning fast laterally and slow axially at a constant depth. In some instances, an en-face C-scan is generated from a set of B-scans.

As used herein, the term "growth rate" refers to a change in a size of a geographic-atrophy lesion over time. The change in size may be an absolute change or a relative change. For example, the growth rate can be a change in a volume or area of a geographic atrophy in an eye. In two-dimensions (e.g., area), the growth rate may be measured in units year per units time (e.g., $mm^2$/year) or as a ratio or a percentage (e.g., an area at a later time point relative to an area at a baseline time point). In three-dimensions (e.g., volume), the growth rate may be measured in units volume per units time (e.g., $mm^3$/year) or as a percentage or ratio (e.g., a volume at a later time point relative to a volume at a baseline time point).

As used herein, the term "geographic atrophy size" refers to a measurable dimension of one or more geographic-atrophy lesions in an eye. For example, in two-dimensions, the geographic atrophy size can be an area of geographic-atrophy lesions (e.g., measured in $mm^2$).

As used herein, the term "current" refers to a baseline time. For example, a current geographic-atrophy lesion size can be the geographic-atrophy lesion size at a time when image data of an eye is generated.

As used herein, the term "progression" refers to a measurable difference from a baseline time to a future time. For example, geographic-atrophy progression can be a growth of a geographic-atrophy from the baseline time to the future time. In some instances, geographic-atrophy progression can be determined from a growth rate.

III. Example Computing Network

Figure 2:
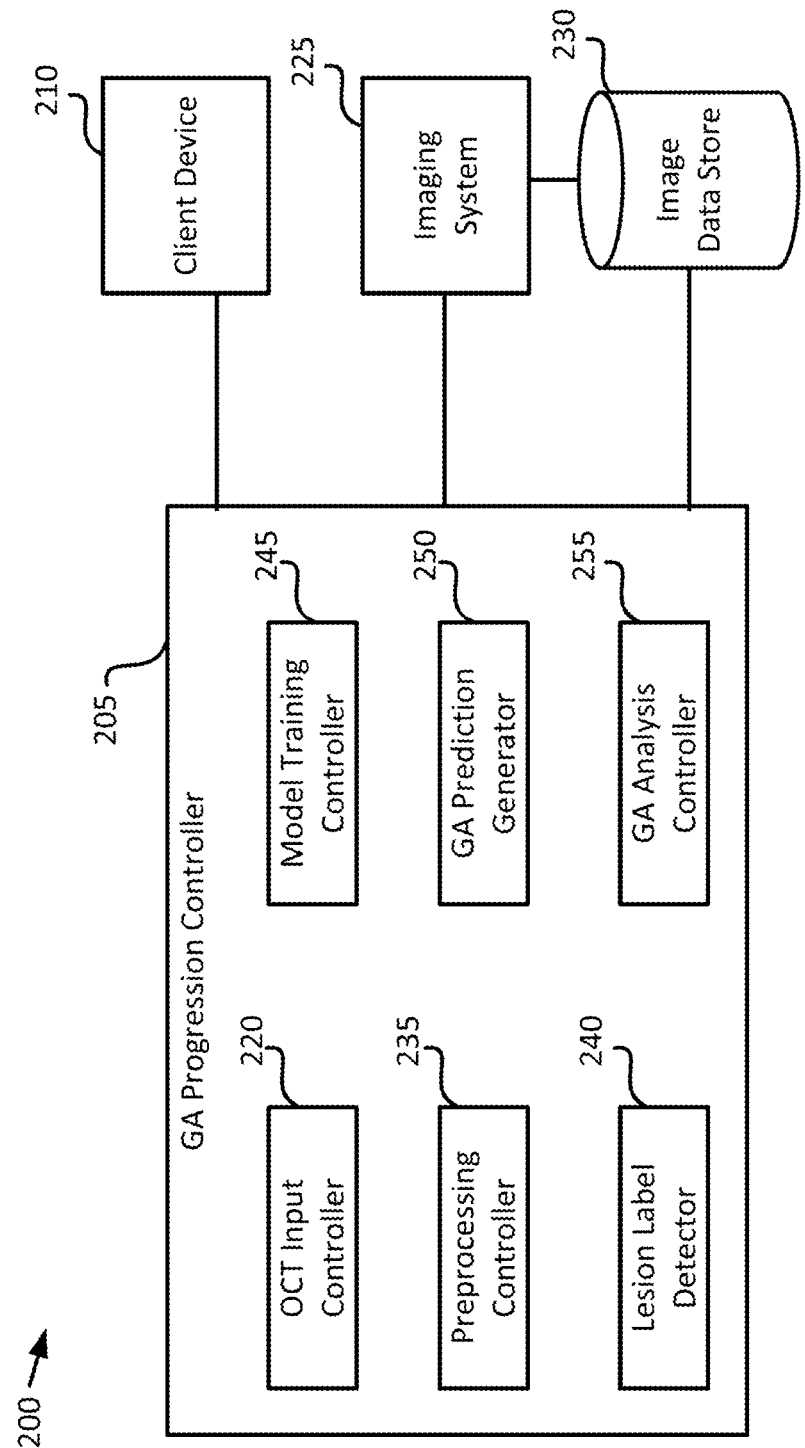
FIG. 2 shows an exemplary computing network for generating predictions of geographic-atrophy lesion sizes and growth rates according to some embodiments.

FIG. 2 illustrates an exemplary personalized GA prediction network 200 for generating predictions of geographic-atrophy lesion growth rates according to some embodiments. A GA progression controller 205 can be configured to train and execute a machine-learning model to generate predictions pertaining to geographic-atrophy states. More particularly, GA progression controller 205 may be configured to receive one or more images of an eye and to output a predicted growth rate or volume of a geographic-atrophy lesion.

The predictions may be generated using one or more machine-learning models, such as one or more CNNs. The CNN(s) may include a three-dimensional CNN and/or a two-dimensional CNN. In some instances, the machine-learning model(s) can include an ensemble machine-learning model that processes aggregated results from a three-dimensional network and a two-dimensional neural network.

The GA progression controller 205 can include an OCT input controller 220 that receives and/or retrieves input data that includes a set of input data objects. The input data objects can include data objects to be used in a training data set to train a machine-learning model and/or data objects to be processed by a trained machine-learning model.

Each input data object may correspond to a particular subject, a particular eye and/or a particular imaging date. An input data object can include (for example) an image of at least part of an eye. An input data object may include an image generated using an imaging technique disclosed herein, such as OCT and/or fundus photography. For example, an input data object may include a set of A-scan images (e.g., each depicting a different longitudinal scan of a particular eye), a set of B-scan images (e.g., each depicting a flattened image), or a set of C-scan images (e.g., each corresponding to a particular depth).

The input data objects may be received and/or retrieved from one or more imaging systems 225, which may include an OCT device and/or fundus camera. In some instances, the imaging system 225 sends one or more images to an image data store 230, which may be partly or fully accessible to the GA progression controller 205.

Input data objects can be preprocessed by a preprocessing controller 235. Preprocessing can include performing a normalization and/or standardization. For example, preprocessing can include histogram matching across scans or channels within the data object (e.g., a set of B-scans) to unify intensities of the B-scans or multiple data objects in a data set. Preprocessing controller 235 can select a B-scan in the set of B-scans to be a reference B-scan based on an average intensity level of the B-scan. The preprocessing controller 235 can perform histogram matching on the remaining B-scans in the set of B-scans to normalize the intensities.

The preprocessing controller 235 can also perform segmentation (e.g., BM segmentation or ILM segmentation) on each B-scan during preprocessing. After segmentation, each B-scan can be flattened along a depiction of a particular biological structure (e.g., the Bruch's membrane (BM) boundary or the inner limiting membrane (ILM) boundary). Segmentation can facilitate volume truncation (e.g., removing upper and lower background portions to reduce neural network limits) and generate en-face maps. After flattening, the preprocessing controller 235 can crop each B-scan to a region of pixels around the boundary. For example, flattened B-scans can be cropped to a region that is 5 pixels above the ILM and 250 pixels below the ILM or to a region that is 120 pixels above the BM and 135 pixels below the BM. A cropped region may be resized to a predefined size (e.g., 512 pixels by 512 pixels) using (for example) resampling, interpolation, and/or bilinear interpolation.

The personalized GA prediction network 200 can include a lesion label detector 240 that can retrieve one or more labels associated with each input data object in a training data set. Labels may have been initially identified based on information provided by an annotator, medical professional, and/or verified database. The labels can include a size of a geographic-atrophy lesion at a subsequent time, a cumulative size of geographic-atrophy lesions at a subsequent time, a difference between the baseline time and subsequent time, a progression of the size of the geographic-atrophy lesion, and/or a progression of the cumulative size of the geographic-atrophy lesions.

A model training controller 245 can execute code to train one or more machine-learning models using one or more training data sets. The machine-learning model(s) can include one or more pre-processing functions, one or more neural networks and/or one or more post-processing functions. It will be appreciated that—with respect to each function, algorithm, and/or network in the model—one or more variables may be fixed during training. For example, hyperparameters of a neural network (e.g., that identify a number of layers, size of an input layer, learning rate, etc.) may be predefined and non-adjustable throughout execution of the code. It will further be appreciated that—with respect to each function, algorithm and/or network in the model—one or more variables may be learned through training. For example, parameters of a neural network (e.g., that identify various inter-node weights) may be learned.

Each training data set can include a set of training data objects. Each of the data objects may include an input image (e.g., an image that depicts a portion of an eye or flattened version thereof). The input image can include one collected at a baseline time.

Each of the data objects can further be associated with one or more labels (e.g., two or more labels). Each of the labels may be based at least in part on information collected at a time subsequent to the baseline time (e.g., at least two weeks, at least a month, at least two months, at least six months, at least a year, at least two years, at least five years, or at least ten years from the baseline time). In some instances, a label of the one or more labels may include a size of a given geographic-atrophy lesion at a subsequent time, a cumulative size of geographic-atrophy lesions at a subsequent time, a difference between the baseline time and subsequent time, a progression of the size of the given geographic-atrophy lesion, and/or a progression of the cumulative size of the lesions. Thus, the training data set may include an image at a baseline time and label data that indicates how and/or whether a subject's geographic atrophy progressed over a period of time.

The model training controller 245 can use the training data to train a machine-learning model. In addition to one or more traditional machine-learning models (e.g., a neural network, binned-based classifier, regression algorithm, etc.), the machine-learning model may further include one or more pre-processing functions and/or one more post-processing functions. For example, a pre-processing function may adjust a sizing, intensity distribution and/or perspective of one or more input images; and/or a post-processing function may transform a model output to a value along a predefined scale (or categorical list), a recommendation, a stratification identifier, and so on.

The model training controller 245 may train various components of the machine-learning model separately or collectively. For example, a training data set may be used to simultaneously train one or more pre-processing algorithms (e.g., that perform segmentation) and a neural network. As another example, a pre-processing algorithm may be trained separately from a neural network (e.g., using same or different parts of a training data).

A GA prediction generator 250 can use the architecture and learned parameters to process non-training data and generate a result. The result may be generated in response to a request communication from a client device 210 (e.g., that includes or identifies input data). For example, the request may identify an identifier of a database, subject, eye, and access password so as to avail a set of images of the eye of the subject. The request communication can correspond to a request to generate a predicted subsequent geographic-atrophy characteristic (e.g., size or growth) of an eye of a subject. The subject to which the request pertains may differ from each subject represented in the training data.

In some instances, the request includes a data object configured to be input to the machine-learning model. In some instances, the request includes a data object configured to undergo preliminary processing (e.g., decryption, standardization, etc.) that will then be configured to be input to the machine-learning model. In some instances, the request includes information that can be used to retrieve a data object configured to be input to the machine-learning model (e.g., one or more identifiers, a verification code and/or passcode).

In some instances, a post-processing function processes a prediction in using (for example) a model, function, or rule. For example, a classifier may be used to assign a severity-prediction result to a subject-eye input data set based on a preliminary result. As another example, a rule may be used to determine whether a treatment change is recommended for consideration based on a preliminary result.

The GA prediction generator 250 can thus access the input data object and feed the data object to the machine-learning model. A result of the machine-learning model may predict a current geographic-atrophy lesion size (e.g., at a time the data object was generated) and/or a subsequent geographic-atrophy lesion state (e.g., a subsequent geographic-atrophy lesion growth or size). The GA progression controller 205 can output a prediction characterizing a subsequent growth of geographic atrophy in the eye (e.g., a growth of one or more geographic-atrophy lesions in the eye) and/or a subsequent size of geographic atrophy in the eye (e.g., a subsequent size of one or more geographic-atrophy lesions in the eye). For example, the prediction may include a probability or likelihood of the subsequent growth or subsequent size of the geographic atrophy in the eye of the subject at a subsequent period in time; a predicted absolute or relative growth; and/or a predicted relative or absolute size of geographic-atrophy lesions. The GA progression controller 205 may additionally generate a prediction of a current size (e.g., area or volume) of one or more geographic-atrophy lesions in the eye.

In some instances, GA prediction generator 250 can execute a three-dimensional convolutional neural network (e.g., trained by model training controller 245). The three-dimensional convolutional neural network may be configured to receive and process a three-dimensional data object (e.g., that corresponds to a set of the flattened B-scans). The three-dimensional convolutional neural network can include one or more three-dimensional convolutional modules (e.g., Inception convolution modules). Each three-dimensional convolutional module can include a set of convolution layers that use at least two different sizes of convolutional filters (e.g., using a 1×1×1 convolution filter, a first 3×3×3 convolution filter, and a second 3×3×3 convolution filter). The three-dimensional convolutional network can alternatively or additionally include one or more three-dimensional convolutional layers.

In some instances, GA prediction generator 250 can execute a two-dimensional and/or multi-channel neural network. For example, a data object may include multi-channel image data. Each channel in the image channel may include (for example) two-dimensional data corresponding to one or more imaging techniques and/or one or more imaging perspectives. For example, two-dimensional image data can include B-scans and/or one or more C-scans. Thus, in some instances, the multi-channel image data includes data corresponding to two or more different types of imaging collection and/or two or more different types of perspectives. The multi-channel image data may be processed by one or more neural network(s) to generate a prediction of a growth rate and/or subsequent size of a geographic-atrophy lesion.

Each of one or more channels of the data channels can include a two-dimensional image corresponding to at least a partial depiction of an eye of a subject. In some examples, three-channel data may include multiple en-face C-scan OCT images. As another example, three-channel data may include at least two en-face C-scan OCT images and at least one B-scan image (e.g., a central B-scan or one or more B-scans corresponding to a pseudo-randomly selected transverse location). As another example, the three-channel data may include at least one en-face C-scan OCT image and at least one image obtained using a type of imaging modality different than OCT (e.g., infra-red and/or fundus auto-fluorescence imaging or cSLO). The three-channel data may alternatively include a full depth-enface OCT image, a sub-BM en-face OCT image (e.g., 100 pixels depth below BM), and an above BM en-face OCT image (e.g., 100 pixels depth above BM). It will be appreciated that, while some disclosures herein refer to "three-channel" data, object data, etc.; it is contemplated that data comprising more than three channels may alternatively be used.

A neural network used by GA prediction generator 250 can include a transfer learning neural network (Inception V3) and/or may be followed by a dense layer. For example, a neural network may be initialized with parameters for predicting a growth rate and/or a subsequent size of a different type of lesion in the eye (e.g., pinguecula, conjunctival lesions, or choroidal melanomas). The neural network can then be further trained to predict a growth rate and/or a subsequent size of a geographic-atrophy lesion in the eye.

The network can include batch normalization, one or more activation layers (e.g., using ReLU activation) and/or one or more pooling layers (e.g., using max pooling). For example, batch normalization, ReLU activation and/or a pooling layer may follow each of one or more convolutional layers. The neural network may include (e.g., in an output layer and/or layer following a last convolutional layer) a global average pooling and/or dense layer. The neural network may include an activation function (e.g., with linear activation). The neural network can include an attention unit, such as a standard Squeeze-and-Excitation (SE) attention unit. An SE attention unit can include global average pooling a feature map from a convolutional layer and applying one or more linear transformations to a result of the pooling. An attention unit may be configured to facilitate adaptively adjusting the weight of each feature map.

In some instances, GA prediction generator 250 can use an ensemble model to process a data object. The ensemble model can include multiple neural networks, such as one or more three-dimensional convolutional neural networks and one or more two-dimensional convolutional neural networks. The ensemble model can process a data object and aggregate results from each of the neural networks. For example, the ensemble model may average a predicted subsequent size of a geographic-atrophy lesion and/or a predicted growth rate of a geographic-atrophy lesion from each of the neural networks. The ensemble model can output the average of the predicted subsequent size and/or subsequent growth of geographic atrophy in the eye of the subject.

The GA analysis controller 255 can process the prediction and communicate the result(s) (or a processed version thereof) to the client device 210 or other system (e.g., associated with a laboratory technician or care provider). For example, GA analysis controller 255 may generate an output of the prediction identifying the subsequent size of geographic atrophy or subsequent growth of geographic atrophy in the eye of the subject. In some instances, GA analysis controller 255 can further post-process a result. For example, GA analysis controller 255 may evaluate one or more rules to determine whether a condition of any of the one or more rules are satisfied. For example, a rule may be configured to be satisfied when a predicted lesion size and/or predicted progression is sufficiently large to recommend a change in treatment. As another example, a rule may be configured to be satisfied to recommend a particular type of treatment approach when a predicted lesion size and/or predicted progression is within a predefined open or closed range. As another example, a rule may be configured to indicate whether a subject is eligible for a clinical trial based on a predicted lesion size and/or predicted progression.

The output may then be presented and/or transmitted, which may facilitate a display of the output data, for example on a display of a computing device (e.g., client device 210).

Figure 3:
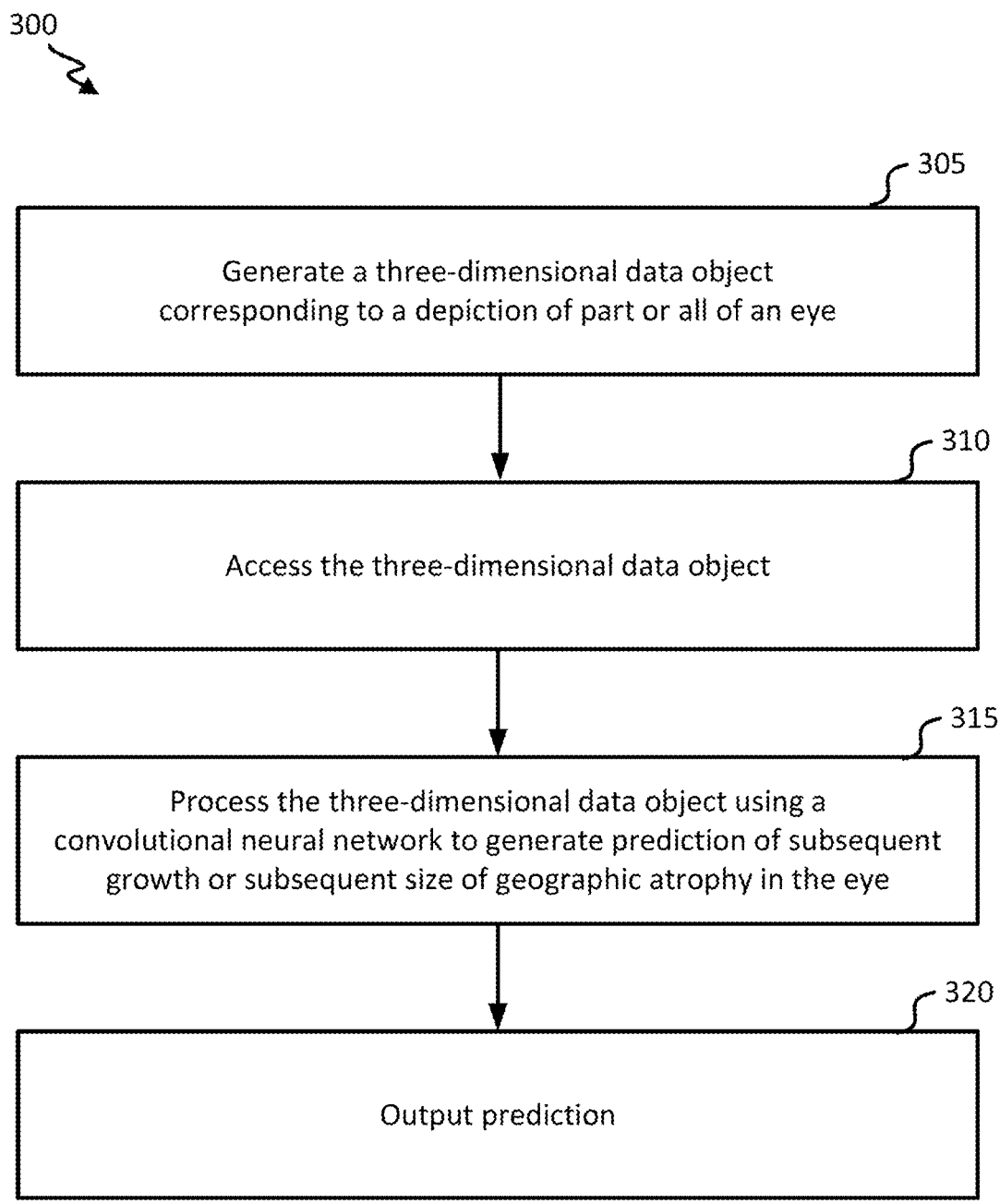
FIG. 3 shows an exemplary process of using a three-dimensional convolutional neural network to predict geographic-atrophy lesion size and growth for a three-dimensional data object according to some embodiments.

IV. Techniques for Geographic-Atrophy Lesion Area and Growth Rate Prediction FIG. 3 shows an exemplary process of using a convolutional neural network to predict geographic-atrophy size and growth for a three-dimensional data object according to some embodiments. At block 305, a three-dimensional data object corresponding to at least a partial depiction of an eye of a subject is generated. The three-dimensional data object may be generated by segmenting each image of a set of two-dimensional images (e.g., B-scans) to identify a segment within the image (e.g., corresponding to Bruch's membrane and/or inner limiting membrane). The three-dimensional data object may alternatively be generated by accessing two-dimensional B-scan OCT images of the eye of the subject, generating feature maps using the two-dimensional B-scan OCT images, and generating the three-dimensional data object so as to include the set of feature maps. As another example, the three-dimensional data object may be generated by accessing a set of two-dimensional B-scan OCT images of the eye of the subject. A set of pixels depicting a particular structure of the eye can be identified for each of the set of two-dimensional B-scan OCT images. For example, a set of pixels depicting a Bruch's membrane, and/or an inner limiting membrane can be identified. Each of the two-dimensional B-scan OCT images can be flattened based on the set of pixels. The three-dimensional data object can then be generated so as to include at least part of each flattened B-scan OCT image.

At block 310, the three-dimensional data object is accessed. The three-dimensional data object may be accessed from a local memory or storage. In some instances where the three-dimensional data object is generated at an imaging or remote system, the three-dimensional data object may be accessed from the imaging or remote system (e.g., imaging system 225 in FIG. 2). The three-dimensional data object can be accessed in response to a remote computing system receiving a request communication (e.g., from a client system) to generate a predicted subsequent geographic-atrophy characteristic of the eye of the subject.

At block 315, the three-dimensional data object is processed using a convolutional neural network to generate a prediction of subsequent growth and/or subsequent size of a geographic atrophy lesion in the eye. The convolutional neural network can be a three-dimensional neural network with one or more convolution modules (e.g., Inception modules) and/or one or more pooling layers. Each convolutional module can include a three-dimensional convolutional module that includes a set of convolution layers. At least two of the set of convolution layers can include convolutional filters of different sizes. For example, a first layer may use a 1×1×1 convolution filter, and each of one or more second layers may use a 3×3×3 convolution filter. The convolutional neural network may further include an attention unit, such as a standard SE Attention Unit that can add parameters to each channel of a convolutional block to facilitate adaptively adjusting the weight of each feature map.

At block 320, the prediction is output. The prediction may be used to facilitate determining eligibility of the subject to participate in a particular clinical study. For example, the prediction of the size of the geographic atrophy being above a threshold can indicate the subject is eligible for the particular clinical study. The prediction may additionally or alternatively be used to facilitate determining a stratification for a particular clinical study in which the subject is or will be involved. For example, the prediction can be used to assign subjects to various treatment and/or control groups in a manner such that the groups have similar default predicted geographic-atrophy assessments if no treatment was administered and/or to parse or normalize results before making comparisons between various groups. A clinical-study result can be generated based on the stratification. The clinical-study result may additionally be output.

In some instances, the prediction may be used to facilitate selecting a treatment for the subject and/or facilitate determining whether to change a treatment for the subject. For example, the machine-learning model may be trained using a training data set corresponding to a set of subjects who were receiving or who had received a particular treatment. A baseline image collected for each subject may correspond to a time period during which treatment was just beginning or was about to begin. The trained model may then be used to predict the extent to which geographic atrophy would progress and/or a subsequent size of a geographic-atrophy lesion if the subject used the particular treatment, which could thus inform whether a care provider recommends the particular treatment (e.g., versus another treatment).

Figure 4:
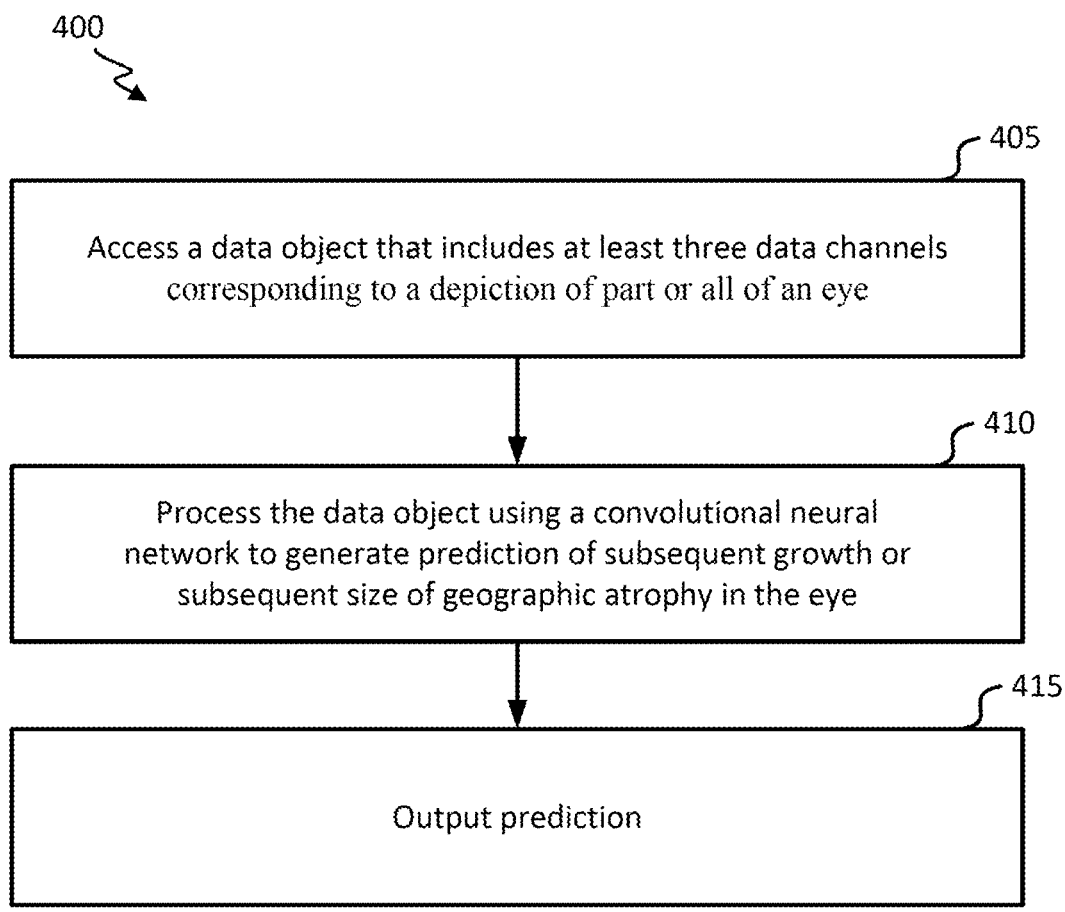
FIG. 4 shows an exemplary process of using a two-dimensional convolutional neural network to predict geographic-atrophy lesion size and growth for a data object according to some embodiments.

FIG. 4 shows an exemplary process of using a convolutional neural network to predict a geographic-atrophy lesion size and growth for a data object according to some embodiments. At block 405, a data object that includes at least three data channels is accessed. Each of the at least three data channels can include a two-dimensional image corresponding to at least a partial depiction of an eye of a subject. The data object can include multiple different en-face OCT-based maps of the eye. In some instances, the data object can include at least two en-face OCT-based scans of the eye and at least one B-scan of the eye (e.g., a central B-scan or one or more B-scans corresponding to a pseudo-randomly selected transverse location). The data object can alternatively include at least one OCT-based en-face scans of the eye and at least one image obtained using a type of imaging modality different than OCT.

At block 410, the data object is processed using a convolutional neural network to generate a prediction of subsequent growth and/or subsequent size of a geographic-atrophy lesion in the eye. The convolutional neural network may further or alternatively generate another prediction of a current size of a geographic-atrophy lesion in the eye. The convolutional neural network can be a two-dimensional neural network that is trained to simultaneously predict a current geographic-atrophy lesion size and a subsequent geographic-atrophy lesion state, which can include a subsequent geographic-atrophy lesion growth or a subsequent geographic-atrophy lesion size. The convolutional neural network may be trained using transfer learning. For example, the convolutional neural network may be initialized with parameters for predicting a growth rate and/or a subsequent size of a different type of lesion in the eye (e.g., pinguecula, conjunctival lesions, or choroidal melanomas). The neural network can then be further trained to predict a growth rate and/or a subsequent size of a geographic-atrophy lesion in the eye. The convolutional neural network can include one or more two-dimensional convolution modules and/or a pooling layer. The convolutional neural network may further include one or more optional units (e.g., SE Attention Units). The convolutional neural network can also include batch normalization, one or more activation layers (e.g., using ReLU activation) and/or one or more pooling layers (e.g., using max pooling).

At block 415, the prediction (e.g., of the subsequent growth, of the current size, and/or of the subsequent size) is output. The prediction may be used to facilitate determining eligibility of the subject to participate in a particular clinical study. For example, the prediction of the size of the geographic-atrophy lesion being above a threshold can indicate the subject is eligible for the particular clinical study. The prediction may additionally or alternatively be used to facilitate determining a stratification for a particular clinical study in which the subject is or will be involved. A clinical-study result can be generated based on the stratification. The clinical-study result may additionally be output.

In some instances, the prediction may be used to facilitate selecting a treatment for the subject and/or facilitate determining whether to change a treatment for the subject. For example, the machine-learning model may be trained using a training data set corresponding to a set of subjects who were receiving or who had received a particular treatment. A baseline image collected for each subject may correspond to a time period during which treatment was just beginning or was about to begin. The trained model may then be used to predict the extent to which geographic atrophy would progress and/or a subsequent size of a geographic-atrophy lesion if the subject used the particular treatment, which could thus inform whether a care provider recommends the particular treatment (e.g., versus another treatment).

V. Examples

V.A. Example 1: Predicting Geographic-Atrophy Growth Rate by Processing Three-Dimensional OCT Images using Neural Networks

V.A.1. Method

The study was performed retrospectively on eyes of subjects with bilateral geographic atrophy enrolled in the lampalizumab phase 3 trial SPECTRI (NCT02247531). The macular Spectralis SD-OCT volumes (Heidelberg Engineering, Inc. Heidelberg, Germany) of 496×1024×49 voxels in 1.92×6×6 mm3 area were used to predict geographic-atrophy lesion area and lesion growth. The geographic atrophy lesion growth rate (in mm$^2$/year) of geographic atrophy lesion area (mm$^2$, measured from FAF images graded by two readers or an adjudicator if necessary) was derived using all available visit measurements and fitted with a linear model. The image datasets from 522 subjects were split by subject into 5 folds. The 5-fold cross-validation was performed with all folds balanced for baseline factors and treatment arms. Each B-scan was flattened along ILM and reduced to the size of 128×128 pixels. A multi-task three-dimensional convolutional neural network (CNN) model was then trained to predict the geographic atrophy growth rate from baseline OCT volumes with initialized weights from the same model trained to predict the geographic-atrophy area. The performance was evaluated by calculating the in-sample coefficient of determination ($R^2$) defined as the square of Pearson correlation coefficient (r) between true and predicted geographic atrophy growth rate.

V.A.2. Results

The geographic atrophy lesion area prediction showed an average cross-validation $R^2$ of 0.88 (range: 0.77 to 0.92), and the geographic atrophy growth rate prediction had an average cross-validation $R^2$ of 0.30 (range: 0.21 to 0.43). The growth rate prediction results are comparable to a previous work on prediction of geographic atrophy growth rate (R2=0.35) by deep learning using baseline multimodal retinal images (Normand G, et al. IOVS 2019; 60: ARVO E-Abstract 1452).

This example show the feasibility of using OCT images to predict individual geographic atrophy growth rate with three-dimensional deep learning approaches. The prediction may be improved by combining with other imaging modalities (e.g., infra-red and fundus autofluorescence) and/or relevant clinical variables.

V.B. Example 2: Predicting Geographic-Atrophy Growth Rate by Processing OCT Images using Neural Networks

V.B.1. Three-Dimensional Model Method

A prediction was formulated as a multi-task regression problem. Let $\{(X_i, (y_1, y_2)_i)\}_{i=1}^{N}$ be the training dataset, where Xi, yi denote the i-th OCT volume and its corresponding geographic-atrophy lesion area ($y_1$) and growth rate ($y_2$) labels; N denotes the total number of samples. The model takes as input a baseline OCT volume and predicts the current geographic-atrophy lesion area and the lesion growth rate.

Figure 5:
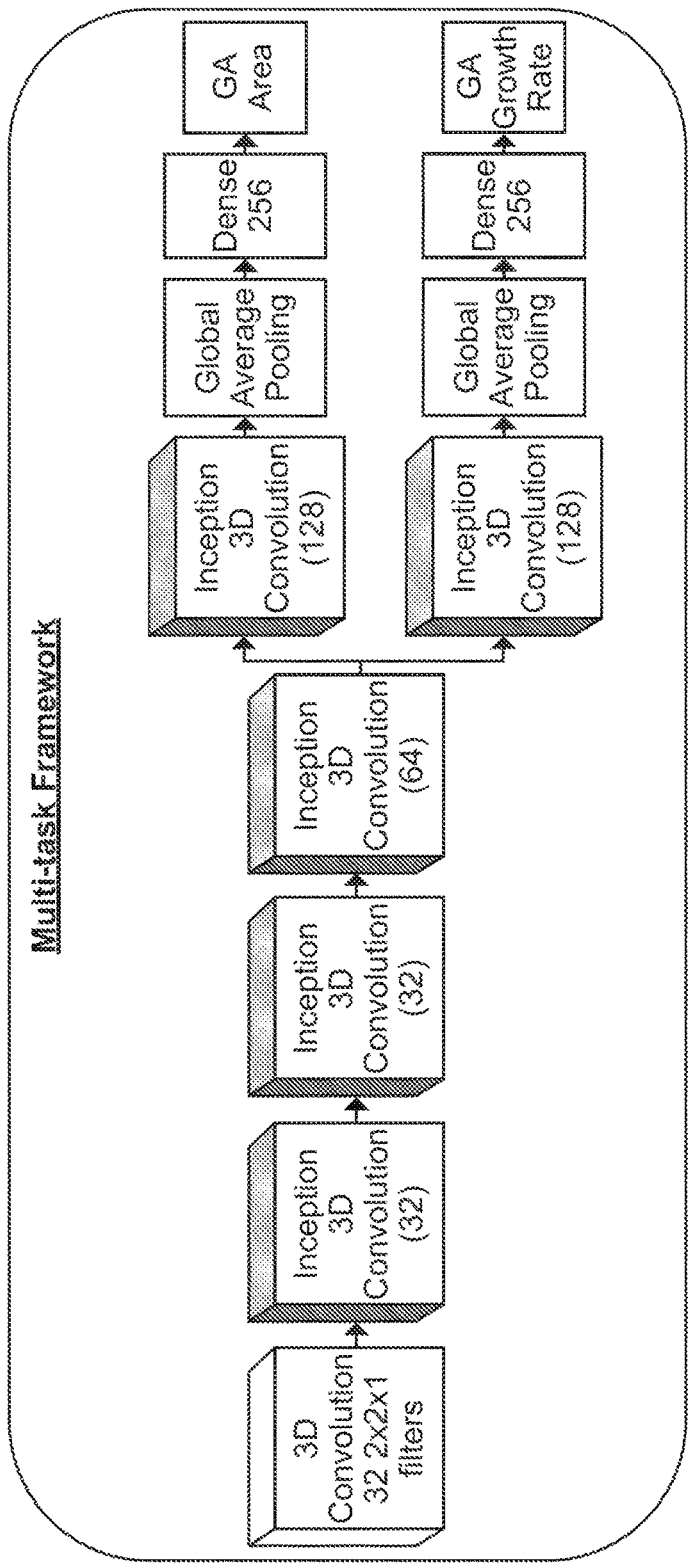
FIG. 5 illustrates an overview of the prediction framework with multi-task three-dimensional Inception convolution modules according to some embodiments.

The overview of the approach is shown in FIG. 5. The three-dimensional OCT volume was first pre-processed and was then input to a multi-task three-dimensional Inception CNN-based model. In addition, a self-attention mechanism using a Squeeze-and-Excitation (SE) unit was added to enhance the feature maps. Geographic-atrophy lesion area and growth rate were simultaneously predicted. Geographic atrophy growth rate has been shown to be weakly correlated with geographic-atrophy lesion area. The multi-task model is expected to find a representation that captures the information for both tasks and to have less chance of overfitting on the growth rate prediction task alone.

V.B.1.a. OCT Image Pre-Processing

The OCT volume included 496 pixels in depth, 1024 A-scans and 49 B-scans (496×1024×49 voxels). The volume size was reduced for the model input and focus on the retina (region of the interest). For each B-scan, the image was flattened along Inner Limiting Membrane (ILM). ILM is the boundary between the retina and the vitreous body, which had been pre-segmented by the OCT machine software (Heidelberg Engineering, Inc. Heidelberg, Germany). Then a region 5 pixels above the ILM and 250 pixels below the ILM for each B-scan was cropped and defined to be the region of interest. Each cropped region (256 pixels in depth×1024 A-scans) was then resized to 128×128 pixels by bilinear interpolation (FIG. 5). There was no reduction in number of B-scans. Therefore, the original volume was reduced to 128×128×49 voxels as the model input.

V.B.1.b. Three-Dimensional Inception Convolution Module

Figure 6:
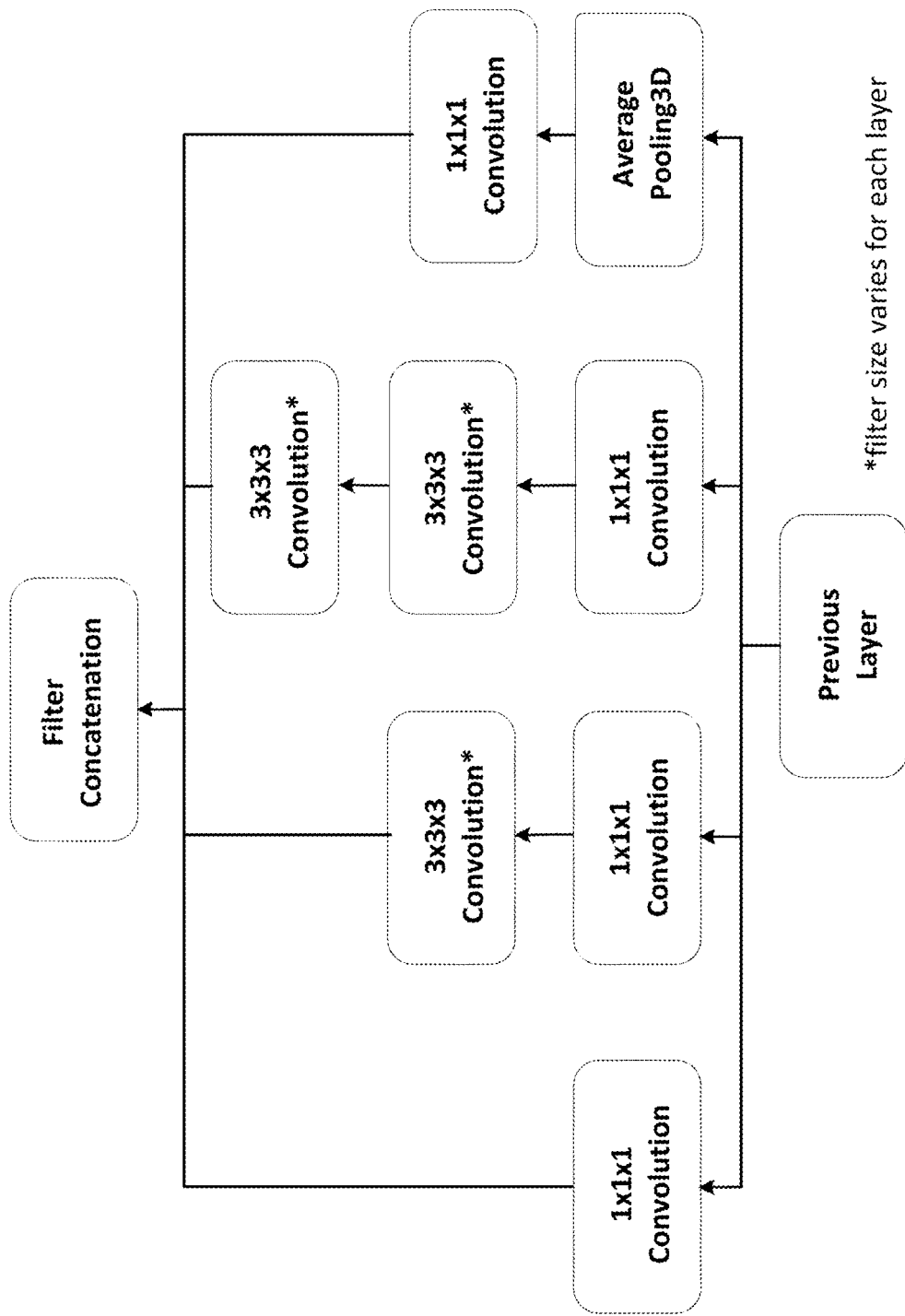
FIG. 6 illustrates an architecture for a three-dimensional Inception convolution module according to some embodiments.

The details of the three-dimensional Inception convolution module are shown in FIG. 6. The network was composed of one regular convolutional layer and four three-dimensional Inception convolutional blocks. Among them, the regular convolutional layer and the first three three-dimensional Inception convolutional blocks are shared by area and growth rate predictions. Each convolution layer was followed by batch-normalization, ReLU activation, and max pooling. After the last convolutional block, global average pooling and a dense layer with linear activation were employed for the output layer. The anisotropic nature of the three-dimensional volume was taken into account in the selection of the filter size, stride, and pooling size. The hyperparameters were optimized using random search.

V.B.1.c. SE Attention Unit and Joint Loss

The SE attention unit in two dimensions was generalized to three dimensions, and was added to the three three-dimensional Inception modules. As in the two-dimensional case, the feature maps from the Inception module are reweighted by the output from the SE unit to take into account the interdependencies between channels. In more details, the output feature maps from three-dimensional Inception module of dimension H×W×D×C are converted to a global tensor of dimension 1×1×1×C by three-dimensional spatial averaging. This tensor is essentially a vector in the channel direction and of the same dimension as the number of channels. A fully connected layer with ReLU activation is applied in the channel direction to reduce the output tensor to a dimension of 1×1×1×C/r, where r is referred to as the reduction ratio and is a divisor of C, the number of channels. The reduction ratio was set as 4 in this study. A second fully connected layer followed by a Sigmoid activation with output dimension 1×1×1×C gives each channel a smooth gating. At last, each feature map of the convolutional block is weighted by multiplying the output from the SE unit. Finally, the joint loss of mean square errors of geographic-atrophy lesion area prediction and growth rate prediction was used for training. The weight for each term was 0.5.

V.B.1.d. Baseline Model

Three additional baseline models were tested to compare the performance and get insights into the model. The first baseline model (i.e., base model) was a simple three-dimensional Inception convolutional neural network to predict the geographic atrophy growth rate only. The model was exactly the same as the proposed model without the SE attention unit and multi-task setting. The model parameter initialization employed He initialization. The second baseline model (i.e., cascade model) used a cascade approach where the model was trained first to predict geographic-atrophy lesion area. The model was then initialized using the weights learned during the area-prediction training and was then trained to predict geographic atrophy growth rate. The cascade model trained for each type of prediction shared the same three-dimensional convolutional architecture as the first baseline model. The third baseline model (i.e., multi-task model) was the multi-task model without the SE attention unit to see whether the SE attention block provided any additional performance gain. The second and third baseline models were trained to predict a current geographic-atrophy lesion area and a future geographic-atrophy lesion area.

V.B.2. Two-Dimensional Model Method

Figure 7:
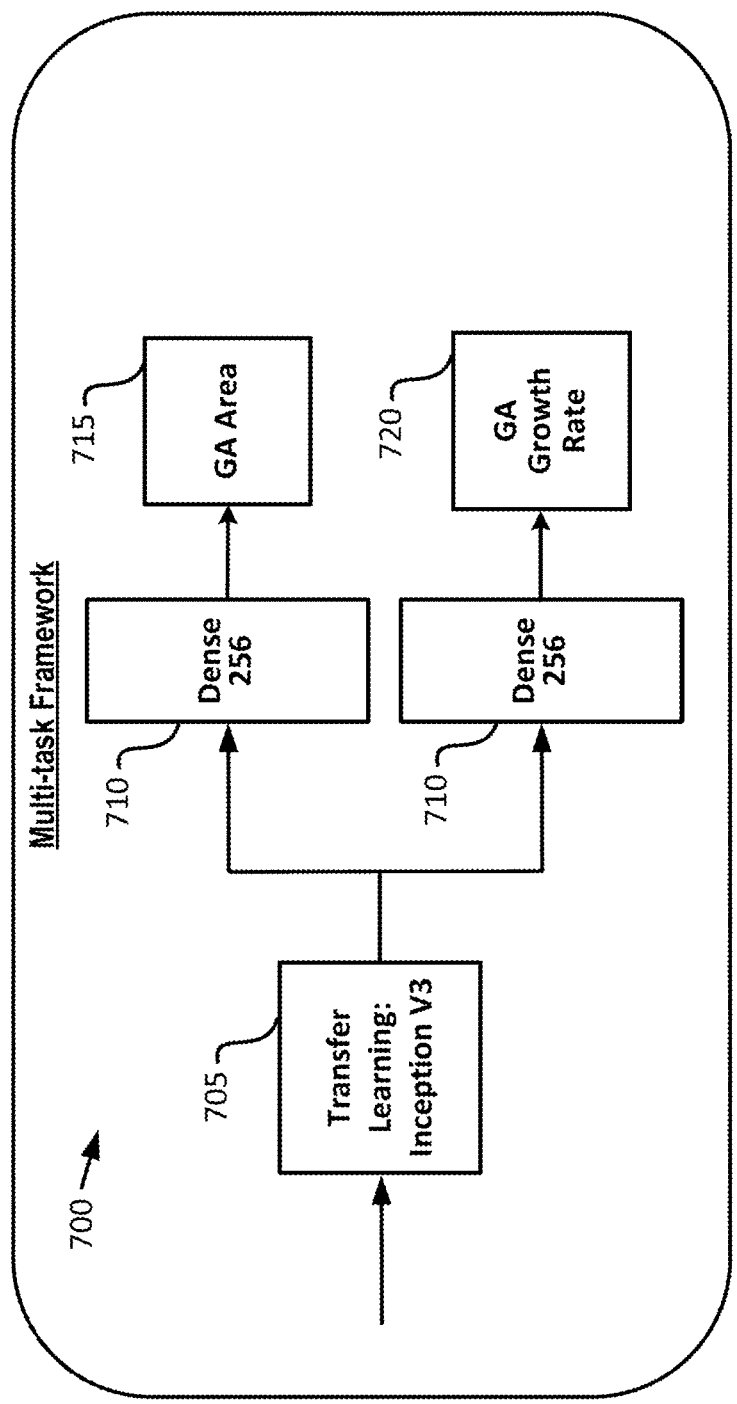
FIG. 7 illustrates an overview of the prediction framework with multi-task two-dimensional convolution modules according to some embodiments.

An overview of the multi-task two-dimensional convolutional network 700 is shown in FIG. 7. The model includes a transfer learning Inception V3 neural network 705. A dense layer 710 is included after the transfer learning Inception V3 network 705. Geographic-atrophy lesion area 715 and growth rate 720 are simultaneously predicted. The two-dimensional multi-task model is expected to find a representation that captures the information for both tasks.

V.B.3. Results

The model was run on the full training dataset of patients with bilateral geographic atrophy enrolled in the Lampalizumab Phase 3 trial SPECTRI (NCT02247531) and evaluated on the hold-out dataset five times. There were 1934 visits from 560 subjects in the training dataset and 114 baseline visits from 114 subjects in the hold-out dataset. The average performance and standard deviation on the hold-out dataset is shown in Table 1. The results show that the proposed model has the best performance on the geographic atrophy growth rate prediction. The multi-task framework contributed most of the improvement compared to the first baseline model. The SE attention block did not seem to improve the performance significantly. The cascade model also performed better than the first baseline model. In contrast, the performance of geographic-atrophy lesion area prediction was comparable among all models.

Example regression plots of the predicted geographic atrophy growth rate against the true growth rate as well as the predicted geographic-atrophy lesion area against the true geographic-atrophy lesion area on all hold-out cases from an additional run of the model are shown in FIGS. 8A and 8B. The square of Pearson correlation coefficient between true and predicted values ($R^2$) of lesion area prediction was 0.92. The performance on cases with relatively small geographic-atrophy lesion area were better than the performance on the cases with larger lesion area. The performance of the growth rate prediction was comparable to a previous work on the prediction of geographic atrophy growth rate ($R^2=0.43$) by deep learning using both baseline FAF and infrared retinal images from a much larger population (2000+ eyes). FIG. 8C shows the OCT en-face image and center B-scan of an outlier in the geographic atrophy growth rate prediction. It can be seen that the OCT volume has motion artifact and pixel intensity inconsistency across B-scans. In addition, the OCT volume size for this case is 496×512×49 voxels; only ~5% of the training data were of this resolution. However, the geographic-atrophy lesion area prediction was in-line with the ground truth. FIG. 8D shows the OCT en-face image and center B-scan of another outlier in both geographic-atrophy lesion area and growth rate predictions. In this case, the image quality is again probably the root cause as several B-scans had fairly low image intensities, the dark band in the OCT en-face image.

TABLE 1

Performance comparison of four models on the hold-out dataset

| $R^2$ | GA Growth Rate Prediction | GA Lesion Area Prediction |
|---|---|---|
| Base Model | 0.25 ± 0.05 | N/A |
| Cascade Model | 0.29 ± 0.03 | 0.91 ± 0.01 |
| Multi-task Model | 0.31 ± 0.02 | 0.91 ± 0.01 |
| Multi-task SE Model | 0.32 ± 0.03 | 0.91 ± 0.01 |

V.B.4. Interpretations

Deep-learning models were thus successfully trained to process OCT volumes to predict geographic atrophy disease progression, without any prior feature engineering. A new customized three-dimensional multi-task deep learning pipeline simultaneously predicted the current geographic-atrophy lesion area and future geographic-atrophy lesion growth rate with high accuracy based only on the baseline OCT volume. The proposed model outperformed other baseline models.

VI. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification, and variation of the concepts herein disclosed may be resorted to by those skilled in the art, and that such modifications and variations are considered to be within the scope of this invention as defined by the appended claims.

The present description provides preferred exemplary embodiments only, and is not intended to limit the scope, applicability or configuration of the disclosure. Rather, the present description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the present description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A method comprising:
   accessing a three-dimensional data object that corresponds to at least a partial depiction of an eye of a subject;
   processing the three-dimensional data object using a convolutional neural network to generate a prediction of a subsequent growth of a geographic-atrophy lesion in the eye or a subsequent size of the geographic-atrophy lesion in the eye, wherein the convolutional neural network was trained to simultaneously predict a current geographic-atrophy lesion size and a subsequent geographic-atrophy state, the subsequent geographic-atrophy state including a subsequent geographic-atrophy lesion growth or a subsequent geographic-atrophy lesion size; and
   outputting the prediction.

2. The method of claim 1, wherein the convolutional neural network includes one or more three-dimensional convolution modules.

3. The method of claim 1, wherein the convolutional neural network includes a pooling layer.

4. The method of claim 1, wherein the processing the three-dimensional data object using the convolutional neural network further generates another prediction of a current size of the geographic-atrophy lesion in the eye.

5. The method of claim 1, wherein the subsequent growth of the geographic atrophy lesion include a growth of one or more geographic-atrophy lesions in the eye, and/or wherein the subsequent size of the geographic atrophy lesion include a subsequent size of one or more geographic-atrophy lesions in the eye.

6. The method of claim 1, further comprising generating the three-dimensional data object by performing a set of operations including segmenting each image of a set of two-dimensional images to identify a segment bounded by a predicted location of a Bruch's membrane and/or an inner limiting membrane.

7. The method of claim 1, further comprising generating the three-dimensional data object by performing a set of operations including:
   accessing a set of two-dimensional B-scan OCT images of the eye of the subject;
   generating a set of feature maps using the set of two-dimensional B-scan OCT images; and
   generating the three-dimensional data object so as to include the set of feature maps.

8. The method of claim 1, further comprising generating the three-dimensional data object by performing a set of operations including:
   accessing a set of two-dimensional B-scan OCT images of the eye of the subject;
   identifying, for each of the set of two-dimensional B-scan OCT images, a set of pixels depicting a particular structure of the eye;
   flattening, for each of the set of two-dimensional B-scan OCT images, the two-dimensional B-scan OCT images based on the set of pixels; and
   generating the three-dimensional data object so as to include at least part of each flattened B-scan OCT image.

9. The method of claim 1, further comprising:
   training another convolutional neural network using a training data set to produce a first set of learned parameter values;
   using transfer learning to train the convolutional neural network by:
      setting a set of parameter values for the convolutional neural network to the first set of learned parameter values; and
      using another training data set to further train the convolutional neural network to produce a second set of learned parameter values, wherein convolutional neural network is configured with the second set of learned parameter values when processing the three-dimensional data object.

10. The method of claim 1, wherein the three-dimensional data object includes a three-dimensional depiction of a volume of the eye of the subject.

11. The method of claim 1, further comprising
inputting, by a user, input data that includes or identifies the three-dimensional data object;
receiving the prediction; and
determining, based on the prediction, that the subject is eligible to participate in a particular clinical study.

12. The method of claim 1, further comprising
inputting, by a user, input data that includes or identifies the three-dimensional data object;
receiving the prediction; and
determining, based on the prediction, a stratification for a particular clinical study in which the subject is or will be involved.

13. The method of claim 12, further comprising:
generating a clinical-study result based on the stratification; and
outputting the clinical-study result.

14. The method of claim 1, further comprising:
inputting, by a user, input data that includes or identifies the three-dimensional data object;
receiving the prediction;
determining, based on the prediction, an adjustment for a particular clinical study in which the subject is or will be involved; and
facilitating an implementation of the adjusted particular clinical study.

15. A method comprising:
receiving input data that includes or identifies a three-dimensional data object that corresponds to at least a partial depiction of an eye of a subject;
receiving a request communication that corresponds to a request to generate a predicted subsequent geographic-atrophy characteristic of the eye of the subject, the request communication including the input data;
processing the three-dimensional data object using a convolutional neural network to generate a prediction of a subsequent growth of a geographic-atrophy lesion in the eye or a subsequent size of the geographic-atrophy lesion in the eye, wherein the convolutional neural network was trained to simultaneously predict a current geographic-atrophy lesion size and a subsequent geographic-atrophy state, the subsequent geographic-atrophy state including a subsequent geographic-atrophy lesion growth or a subsequent geographic-atrophy lesion size; and
outputting the prediction.

16. The method of claim 15, further comprising:
collecting a set of images of the eye of the subject, wherein the three-dimensional data object is generated using the set of images.

17. Use of a geographic-atrophy prediction in a treatment of a subject, wherein the geographic-atrophy prediction is provided by a computing device implementing a computational model based on subject data to provide the geographic-atrophy prediction, the computational model including a convolutional neural network configured to process a three-dimensional data object corresponding to at least a partial depiction of an eye of the subject, wherein the convolutional neural network was trained to simultaneously predict a current geographic-atrophy lesion size and a subsequent geographic-atrophy state, the subsequent geographic-atrophy state including a subsequent geographic-atrophy lesion growth or a subsequent geographic-atrophy lesion size.

18. A method comprising:
accessing a data object that includes at least three data channels, each of the at least three data channels comprising a two-dimensional image corresponding to at least a partial depiction of an eye of a subject;
processing the data object using a convolutional neural network to generate a prediction of a subsequent growth of a geographic-atrophy lesion in the eye or a subsequent size of the geographic-atrophy lesion in the eye, wherein the convolutional neural network was trained to simultaneously predict a current geographic-atrophy lesion size and a subsequent geographic-atrophy state, the subsequent geographic-atrophy state including a subsequent geographic-atrophy lesion growth or a subsequent geographic-atrophy lesion size; and
outputting the prediction.

19. The method of claim 18, wherein the data object includes multiple different en-face OCT-based maps of the eye.

20. The method of claim 18, wherein the data object includes at least two en-face OCT-based scans of the eye and at least one B-scan of the eye.

21. The method of claim 18, wherein the data object includes at least one OCT-based en-face scans of the eye and at least one image obtained using a type of imaging modality different than OCT.

22. A system comprising:
one or more data processors; and
a non-transitory computer readable storage medium containing instructions which, when executed on the one or more data processors, cause the one or more data processors to:
access a three-dimensional data object that corresponds to at least a partial depiction of an eye of a subject;
process the three-dimensional data object using a convolutional neural network to generate a prediction of a subsequent growth of a geographic-atrophy lesion in the eye or a subsequent size of the geographic-atrophy lesion in the eye, wherein the convolutional neural network was trained to simultaneously predict a current geographic-atrophy lesion size and a subsequent geographic-atrophy state, the subsequent geographic-atrophy state including a subsequent geographic-atrophy lesion growth or a subsequent geographic-atrophy lesion size; and
output the prediction.

23. A computer-program product tangibly embodied in a non-transitory machine-readable storage medium, including instructions configured to cause one or more data processors to:
access a three-dimensional data object that corresponds to at least a partial depiction of an eye of a subject;
process the three-dimensional data object using a convolutional neural network to generate a prediction of a subsequent growth of a geographic-atrophy lesion in the eye or a subsequent size of the geographic-atrophy lesion in the eye, wherein the convolutional neural network was trained to simultaneously predict a current geographic-atrophy lesion size and a subsequent geographic-atrophy state, the subsequent geographic-atrophy state including a subsequent geographic-atrophy lesion growth or a subsequent geographic-atrophy lesion size; and
output the prediction.

* * * * *